United States Patent
Miwa et al.

(10) Patent No.: US 6,675,785 B2
(45) Date of Patent: Jan. 13, 2004

(54) IGNITION DEVICE FOR AN INTERNAL COMBUSTION ENGINE

(75) Inventors: Tetsuya Miwa, Nagoya (JP); Atsuya Mizutani, Yokkaichi (JP); Takeo Maekawa, Okazaki (JP); Hiromi Hiramatsu, Kariya (JP); Tohru Yoshinaga, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/397,266

(22) Filed: Mar. 27, 2003

(65) Prior Publication Data

US 2003/0183217 A1 Oct. 2, 2003

(30) Foreign Application Priority Data

Apr. 1, 2002 (JP) ........................................ 2002-098507

(51) Int. Cl.[7] ................................................ F02P 13/00
(52) U.S. Cl. ........................ 123/635; 123/634; 123/647; 73/35.12
(58) Field of Search ................................ 123/634, 635, 123/647, 169 R; 73/35.12; 315/57

(56) References Cited

U.S. PATENT DOCUMENTS

| 5,111,790 | A | * | 5/1992 | Grandy ........................ 123/635 |
| 5,411,006 | A | * | 5/1995 | Noble et al. ................. 123/634 |
| 5,672,812 | A | * | 9/1997 | Meyer ......................... 73/35.07 |
| 6,119,667 | A | | 9/2000 | Boyer et al. ................. 123/634 |
| 6,122,971 | A | * | 9/2000 | Wlodarczyk .................. 73/705 |
| 6,149,336 | A | * | 11/2000 | Bartley et al. ............... 123/635 |
| 2002/0121127 | A1 | * | 9/2002 | Kiess et al. ................. 73/35.07 |

FOREIGN PATENT DOCUMENTS

| EP | 0907019 A2 | 4/1999 |
| EP | 0987435 A2 | 3/2000 |
| JP | 9-260024 | * 3/1997 |
| JP | 2000-91057 | 3/2000 |
| JP | 2000-252040 | 9/2000 |
| JP | 2000-277232 | 10/2000 |

* cited by examiner

Primary Examiner—Erick Solis
(74) Attorney, Agent, or Firm—Nixon & Vanderhye P.C.

(57) ABSTRACT

An insulator includes a coil side cylindrical portion extending from a plug side cylinder portion in a direction departing from a combustion chamber. One end of the coil side cylindrical portion protrudes in the direction departing from the combustion chamber with respect to a primary winding and a secondary winding. A pressure sensing element is disposed next to the one end of the coil side cylindrical portion. The signal lines of the pressure sensing element are taken out of a casing without passing aside an ignition coil. Thus, the diameter of the casing does not increase. The output signal of the pressure sensing element is not adversely influenced by discharge noises generated from the ignition coil.

2 Claims, 4 Drawing Sheets

IGNITION DEVICE FOR AN INTERNAL COMBUSTION ENGINE

BACKGROUND OF THE INVENTION

1. Field of the Invention

The present invention relates to an ignition device for an internal combustion engine which integrally incorporates a spark plug and an ignition coil and also incorporates a pressure detecting element for detecting a pressure of a combustion chamber.

2. Description of the Background Art

There are various kinds of conventional ignition devices for the internal combustion engine which integrally incorporates a spark plug and an ignition coil (refer to Japanese Patent Application Laid-open No. 2000-252040 and European Patent Application Laid-open No. 0907019).

Furthermore, Japanese Patent Application Laid-open No. 2000-277232 proposes an ignition device for an internal combustion engine which incorporates a pressure sensing element for detecting a pressure of a combustion chamber. According to this conventional ignition device, the pressure sensing element is disposed outside a cylindrical body of the spark plug. The signal lines of the pressure sensing element are taken out of the casing while they pass aside the ignition coil.

However, according to the ignition device for an internal combustion engine described in Japanese Patent Application Laid-open No. 2000-277232, it is necessary to secure a space between the ignition coil and the casing for taking the signal lines of the pressure sensing element out of the casing. Accordingly, the diameter of the casing necessarily increases. Furthermore, the signal lines of the pressure sensing element pass aside the ignition coil which generates noises. Therefore, these lines definitely require an effective countermeasure against noises.

SUMMARY OF THE INVENTION

In view of the foregoing problems, the present invention has an object to provide an ignition device for an internal combustion engine which integrally incorporates a spark plug, an ignition coil, and a pressure sensing element and installed in a cylinder head, according to which the increase in diameter of a casing can be suppressed and the output signal of the pressure sensing element is not adversely influenced by discharge noises.

To accomplish the above and other related objects, the present invention provides an ignition device for an internal combustion engine, including a spark plug having a center electrode accommodated in a cylindrical insulator for generating a spark discharge in a combustion chamber of an internal combustion engine, an ignition coil having a primary winding and a secondary winding for supplying high voltage to said spark plug, and a pressure sensing element for detecting a pressure of the combustion chamber. The spark plug, the ignition coil, and the pressure sensing element are accommodated in a cylindrical casing and installed in a cylinder head of the internal combustion engine. The insulator includes a plug side cylindrical portion having an inner space for accommodating the center electrode and a coil side cylindrical portion extending from the plug side cylindrical portion in a direction departing from the combustion chamber. The coil side cylindrical portion has one end protruding in the direction departing from the combustion chamber with respect to the primary winding and the secondary winding. And, the pressure sensing element is disposed next to the one end of the coil side cylindrical portion.

The pressure sensing element is disposed at a far side compared with the ignition coil with respect to the combustion chamber. The signal lines of the pressure sensing element can be taken out of the casing without passing aside the ignition coil. Thus, the diameter of the casing does not increase. The output signal of the pressure sensing element is not influenced by discharge noises generated from the ignition coil. There is no necessity of employing complicated layout for the signal lines.

It is preferably that a holding member for holding the pressure sensing element is disposed next to the one end of the coil side cylindrical portion via the pressure sensing element, an outer cylindrical surface of the insulator is brought into contact with a receiving surface formed on an inner cylindrical surface of the casing so that the insulator is placed in a predetermined position with respect to the casing, and the pressure sensing element and the insulator are pressed to the receiving surface of the casing by the holding member assembled with the casing.

A preload is always applied on the pressure sensing element. This assures sensor output accuracy against pressure variation in the combustion chamber. Furthermore, pressing the insulator to the receiving surface of the casing makes it possible to provide a hermetical contact between the receiving surface of the casing and the abutting surface of the insulator for preventing the combustion gas from leaking out via the clearance between the casing and the insulator.

BRIEF DESCRIPTION OF THE DRAWINGS

These and other objects, features, aspects and advantages of the present invention will become more apparent from the following detailed description of the present invention when taken in conjunction with the accompanying drawings, in which.

DESCRIPTION OF THE PREFERRED EMBODIMENTS

Figure 1:
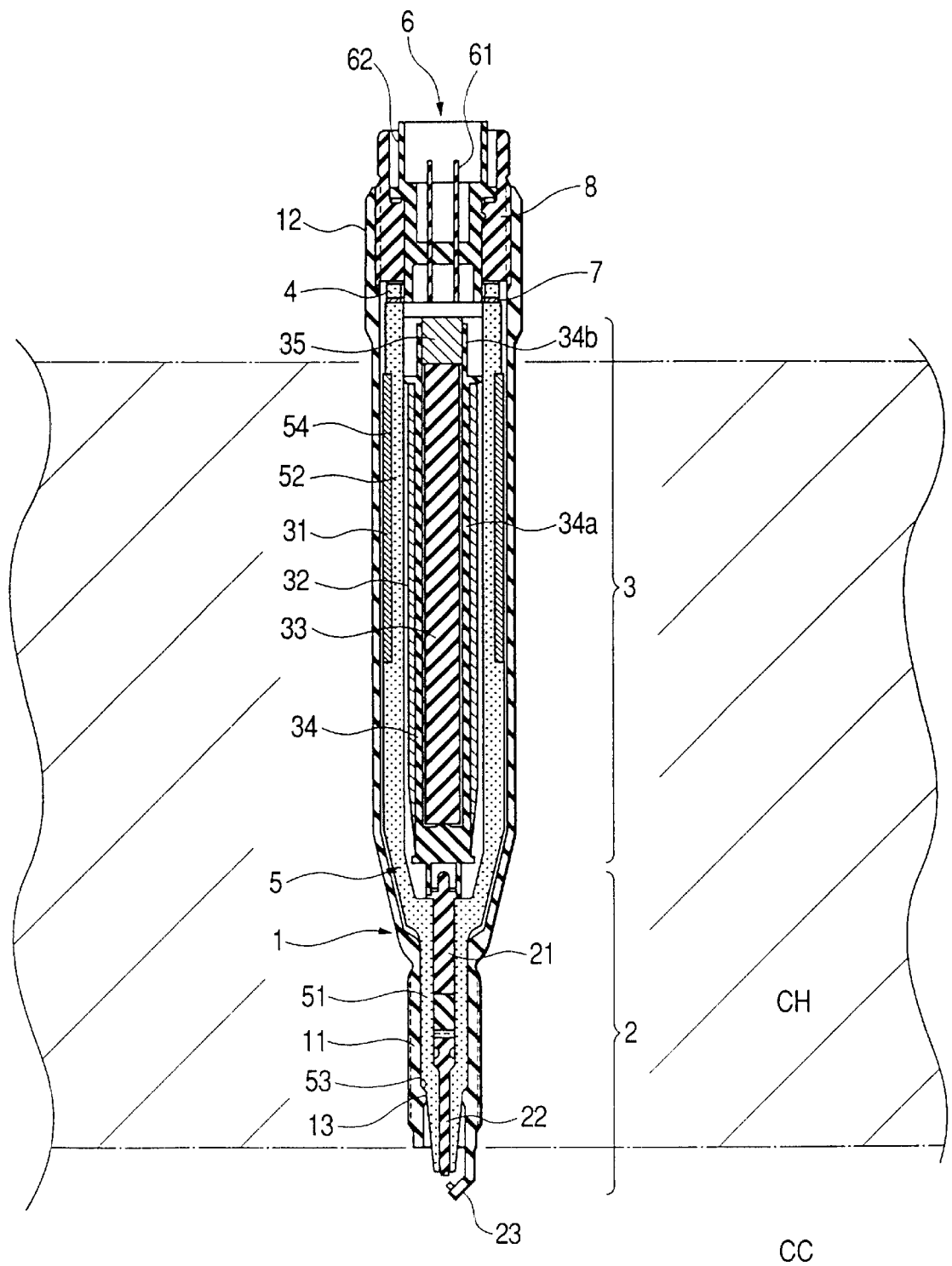
FIG. 1 is a cross-sectional view showing an overall arrangement of an ignition device for an internal combustion engine in accordance with a preferred embodiment of the present invention.
Figure 2:
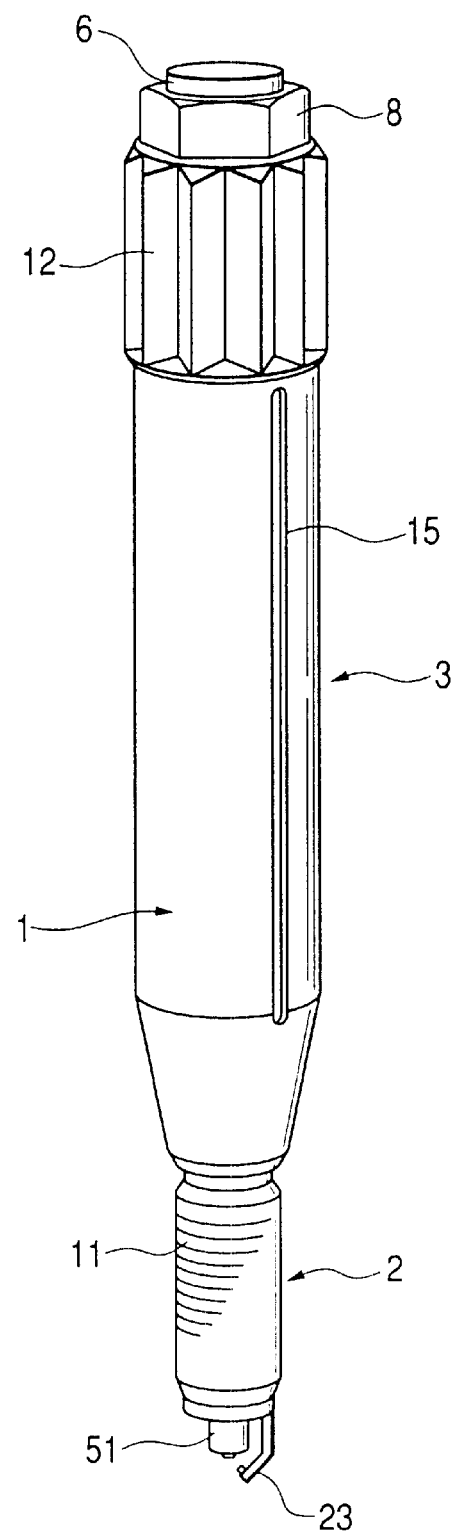
FIG. 2 is a perspective view showing an appearance of the ignition device shown in FIG. 1.
Figure 3:
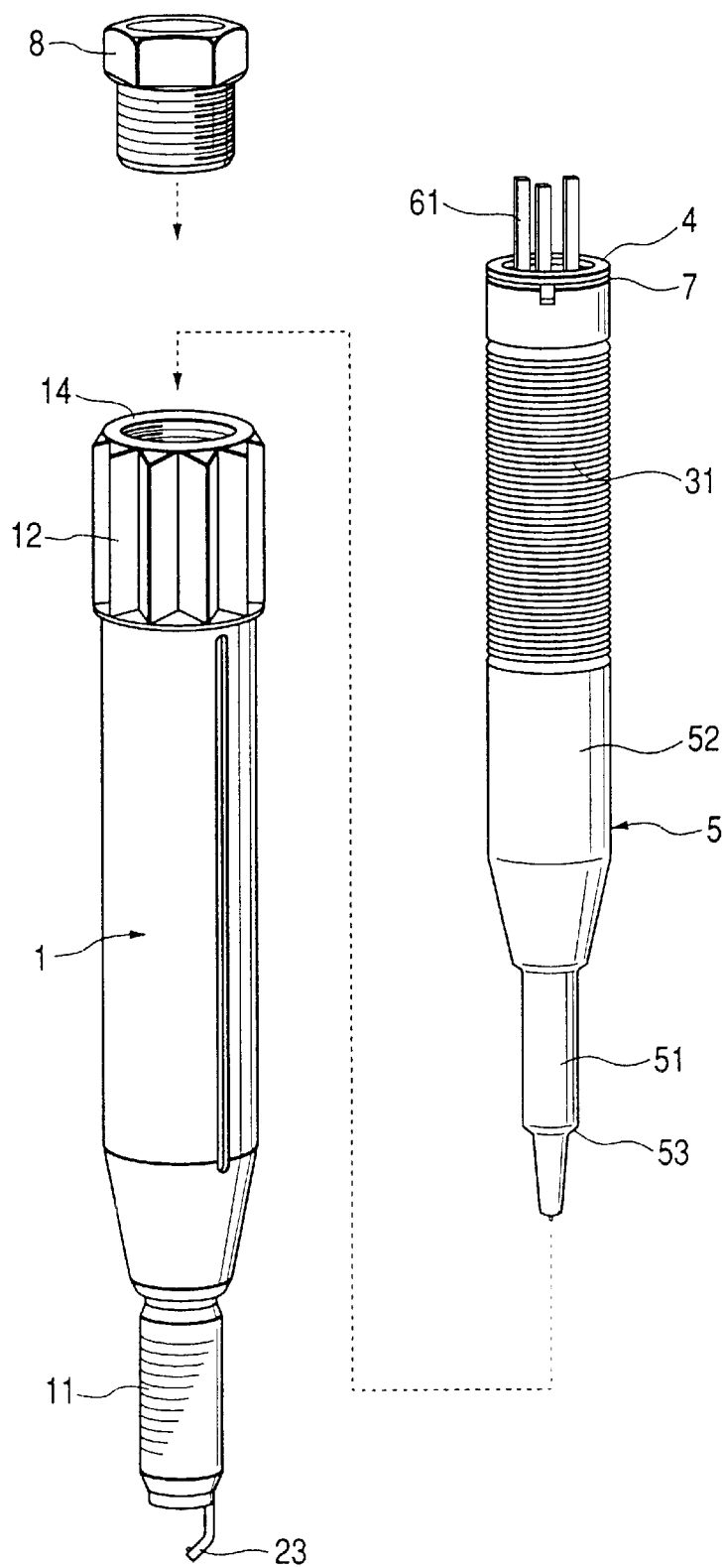
FIG. 3 is an exploded perspective view showing overall assembling of the ignition device shown in FIG. 1.
Figure 4:
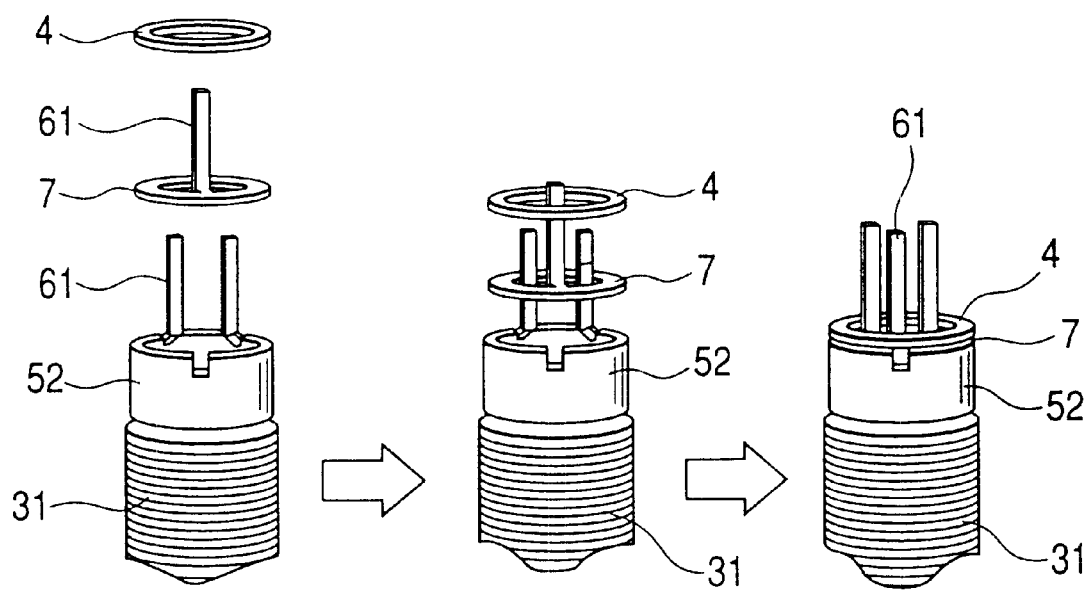
FIG. 4 is a perspective view showing assembling of a pressure sensing element shown in FIG. 1.

FIGS. 1 through 4 are views showing an ignition device for an internal combustion engine in accordance with a preferred embodiment of the present invention. FIG. 1 is a cross-sectional view showing an overall arrangement of the ignition device in accordance with the preferred embodiment of the present invention. FIG. 2 is a perspective view showing an appearance of the ignition device in accordance with the preferred embodiment of the present invention. FIG. 3 is an exploded perspective view showing overall assembling of the ignition device in accordance with the preferred embodiment of the present invention. FIG. 4 is a perspective view showing assembling of a pressure sensing element 4 in accordance with the preferred embodiment of the present invention.

As shown in FIGS. 1 and 2, the ignition device includes a cylindrical casing 1 made of a magnetic and electrically conductive steel member. A spark plug 2, an ignition coil 3 and a pressure sensing element 4 are accommodated or housed in the casing 1. The spark plug 2 is installed in a plug hole of a cylinder head so that both electrodes (described later in more detail) of the spark plug 2 are exposed to a combustion chamber of an automotive internal combustion engine. The cylinder head is roughly indicated by the reference 'CH' in FIG. 1. The combustion chamber is roughly indicated by the reference 'CC' in FIG. 1.

More specifically, an external thread portion 11 is formed on the outer surface of the casing 1 at a predetermined region close to the combustion chamber. Furthermore, a nut portion 12 is formed on the outer surface of the casing 1 at a predetermined region far from the combustion chamber. When the nut portion 12 is rotated by a fastening tool, the casing 1 rotates and advances into a hole of the cylinder head and engages with an internal thread portion formed in this hole (not shown). The ignition device is thus firmly fixed to the cylinder head.

The casing 1 accommodates a cylindrical insulator 5 which is made of an alumina or a comparable member possessing excellent electrical insulation properties. The insulator 5 includes a plug side cylindrical portion 51 and a coil side cylindrical portion 52 extending from the plug side cylindrical portion 51 in a direction departing from the combustion chamber.

The casing 1 has an inner cylindrical surface on which a stepped receiving surface 13 is formed at a region close to the combustion chamber. The plug side cylindrical portion 51 of the insulator 5 has an outer cylindrical surface on which a stepped abutting surface 53 is formed. The stepped abutting surface 53 of the insulator 5 mates with the stepped receiving surface 13 of the casing 1. In other words, when the stepped abutting surface 53 is engaged with the stepped receiving surface 13, the insulator 5 is positioned in the axial direction a predetermined positional relationship with respect to the casing 1. Furthermore, hermetical contact between the stepped abutting surface 53 and the stepped receiving surface 13 serves as a seal for preventing the combustion gas from leaking out via the clearance between the insulator 5 and the casing 1.

The spark plug 2 includes a stem 21 made of an electrically conductive metal, a center electrode 22 made of an electrically conductive metal, and a ground electrode 23 made of an electrically conductive metal. The stem 21 and the center electrode 22 are accommodated in a center bore axially extending in the plug side cylindrical portion 51 of the insulator 5. One end of the center electrode 22 protrudes into the combustion chamber. The ground electrode 23 is integrally welded to the casing 1. The ground electrode 23 is disposed in a confronting relationship with the protruding end of the center electrode 22.

The ignition coil 3 includes a primary winding 31, a secondary winding 32, a columnar center core which is made of a magnetic member, and a secondary spool 34 which is made of an electrically insulating resin and configured into a cup shape having a bottom.

The primary winding 31, as shown in FIG. 3, is directly wound in a recessed portion 54 on an outer cylindrical surface of the coil side cylindrical portion 52. In this respect, the coil side cylindrical portion 52 serves as a primary spool. Both ends of the primary winding 31 are connected to connector terminals 61 of a connector 6 via terminals (not shown). With this arrangement, the primary winding 31 receives a control signal supplied from an igniter (not shown).

A portion of the casing 1 surrounding the primary winding 31 serves as an external core. As shown in FIG. 2, at least one slit 15 extending in the axial direction is formed on the outer surface of the casing 1 at the region corresponding to the portion surrounding the primary winding 31. This slit 15 prevents the loss to be caused by the ring current generated in response to the change of magnetic flux.

The secondary spool 34 includes a winding cylindrical portion 34a for the secondary winding 32 and a protruding cylindrical portion 34b which protrudes from the winding cylindrical portion 34a in a direction departing from the combustion chamber. The secondary winding 32 is wound around the outer surface of the winding cylindrical portion 34a. The secondary spool 34 has a center bore extending in the axial direction thereof for accommodating a center core 33. After the center core 33 is inserted into the center bore of the secondary spool 34, the open end of the secondary spool 34 is closed by a core pressing pad 35. The core pressing pad 35 is made of a rubber, a sponge or a comparable elastic member. Thus, the center core 33 is confined in the secondary spool 34.

After accomplishing the assembling of the secondary spool 34 with the secondary winding 32, the center core 33 and the core pressing pad 35, the secondary spool 34 is inserted into the center bore of the coil side cylindrical portion 52. Then, an electrically insulating resin is injected or poured into an inside space of the insulator 5 from the open end of the coil side cylindrical portion 52 positioned higher, while the insulator 5 is held in an upright position. The injected resin flows into the clearance between the coil side cylindrical portion 52 and the secondary winding 32, and then hardens itself together with the secondary winding 32.

In this case, an injection amount of the resin is carefully controlled so as not to overflow beyond the open end of the protruding cylindrical portion 34b. This surely prevents the flowing resin from entering into the center bore of the secondary spool 34. Meanwhile, the core pressing pad 35 has a function of preventing the flowing resin from entering into the center bore of the secondary spool 34. Accordingly, the portion integrally hardened or fixed with the insulating resin is limited only to the secondary winding 32.

In the condition shown in FIG. 1, the high-voltage end of the secondary winding 32 is connected to the center electrode 22 of the spark plug 2. The low-voltage end of the secondary winding 32 is connected to the casing 1 via a terminal (not shown). The casing 1 is grounded to a vehicle body (not shown) via the cylinder head and others.

According to the above arrangement, the coil side cylindrical portion 52 of the insulator 5 completely insulates the high-voltage portion of the ignition coil 3 from the low-voltage portion of the ignition coil 3. In this case, the high-voltage portion includes the secondary winding 32 and the component connecting the stem 21 to the high-voltage end of the secondary winding 32. The low-voltage portion includes the primary winding 31 and the casing 1.

The pressure sensing element 4 produces an output signal whose voltage level varies in accordance with the load applied on this pressure sensing element 4. For example, the pressure sensing element 4 is made of a lead titanate and is configured into a thin ring plate. A terminal 7, positioned next to the pressure sensing element 4, is made of an electrically conductive metal and configured into a thin ring plate. The pressure sensing element 4 and the terminal 7 are disposed next to the open end of the coil side cylindrical portion 52. A connector terminal 61 is integrally formed with the terminal 7 (refer to FIG. 4).

The primary winding 31 and the secondary winding 32 are offset inward from the open end of the coil side cylindrical portion 52 so as to secure a space for disposing the pressure sensing element 4 closely to the open end of the coil side cylindrical portion 52. In other words, in the illustration of FIG. 1, the upper end of the coil side cylindrical portion 52 protrudes in the direction departing from the combustion chamber with respect to the primary winding 31 and the secondary winding 32.

The casing 1 has an inner cylindrical surface on which an internal thread portion 14 is formed at a region far from the combustion chamber (refer to FIG. 3). A cylindrical bolt 8, serving as a holding member for holding the pressure sensing member 4, has an external thread portion screwed into the opening of the casing 1 and engaged with the internal thread portion 14. The pressure sensing element 4 and the terminal 7 are sandwiched between the open end of the coil side cylindrical portion 52 and the bolt 8.

More specifically, the spark plug 2, the secondary winding 32, the center core 33, and the secondary spool 34 are assembled into the inside space of insulator 5 under the condition that the primary winding 31 is wound around the outer surface of the insulator 5. Then, as shown in FIG. 4, the terminal 7 and the pressure sensing element 4 are successively placed on the open end of the coil side cylindrical portion 52. Next, as shown in FIG. 3, the assembly of the insulator 5 is inserted into the casing 1. Then, the bolt 8 is screwed into the open end of the casing 1 and tightened with the internal thread portion 14 of the casing 1, thereby firmly depressing the pressure sensing element 4, the terminal 7, and the insulator 5 to the receiving surface 13.

Fastening the bolt 8 in this manner brings an effect of giving a compression preload on the pressure sensing element 4 and also brings an effect of providing a hermetical contact between the receiving surface 13 and the abutting surface 53 of the insulator 5 so as to prevent the combustion gas from leaking out via the clearance between the casing 1 and the insulator 5.

One end of the pressure sensing element 4 is electrically connected to the casing 1 via the bolt 8. The other end of the pressure sensing element 4 is connected to the terminal 7. Via these electrical paths, the output signal of the pressure sensing element 4 is sent to a control device (not shown).

After the bolt 8 is tightened with the internal thread portion 14, a resin casing 62 of the connector 6 is inserted into the inner bore of the bolt 8 from the outside.

According to the ignition device having the above-described arrangement, the ignition coil 3 generates high voltage in response to a control signal supplied from the igniter. When the high voltage is applied between the electrodes, the spark plug 2 generates a spark discharge in a discharge gap formed between the electrodes so as to ignite the gas mixture confined in the combustion chamber. The combustion of gas mixture in the combustion chamber generates a pressure which is transmitted to the pressure sensing element 4 via the insulator 5. Thus, the pressure sensing element 4 receives a compression load representing the combustion pressure. Then, the pressure sensing element 4 produces the output signal having a voltage level corresponding to the detected load.

According to the above-described embodiment, the open end of the coil side cylindrical portion 52 protrudes in the direction departing from the combustion chamber with respect to the primary winding 31 and the secondary winding 32. The pressure sensing element 4 is disposed next to the open end of the coil side cylindrical portion 52. Therefore, the signal lines of the pressure sensing element 4 can be taken out of the casing 1 without passing the side of the ignition coil 3. Hence, without increasing the diameter of the casing 1, it becomes possible to prevent the output signal of the pressure sensing element 4 from being adversely influenced by discharge noises generated from the ignition coil 3. There is no necessity of employing complicated layout of the signal lines.

As apparent from the above-described preferred embodiment, the present invention provides an ignition device for an internal combustion engine, including a spark plug (2) having a center electrode (22) accommodated in a cylindrical insulator for generating a spark discharge in a combustion chamber of an internal combustion engine, an ignition coil (3) having a primary winding (31) and a secondary winding (32) for supplying high voltage to said spark plug (2), and a pressure sensing element (4) for detecting a pressure of the combustion chamber, wherein the spark plug (2), the ignition coil (3), and the pressure sensing element (4) are accommodated in a cylindrical casing (1) and installed in a cylinder head of the internal combustion engine, the insulator (5) includes a plug side cylindrical portion (51) having an inner space for accommodating the center electrode (22) and a coil side cylindrical portion (52) extending from the plug side cylindrical portion (51) in a direction departing from the combustion chamber, the coil side cylindrical portion (52) has one end protruding in the direction departing from the combustion chamber with respect to the primary winding (31) and the secondary winding (32), and the pressure sensing element (4) is disposed next to the one end of the coil side cylindrical portion (52).

According to this arrangement, the pressure sensing element (4) is disposed at a far side compared with the ignition coil (3) with respect to the combustion chamber. The signal lines of the pressure sensing element (4) can be taken out of the casing (1) without passing aside the ignition coil (3). Thus, the diameter of the casing (1) does not increase. The output signal of the pressure sensing element (4) is not influenced by discharge noises generated from the ignition coil (3). There is no necessity of employing complicated layout for the signal lines.

Furthermore, the compression preload is given to the pressure sensing element (4) by tightening the bolt (8). This makes it possible to assure output accuracy with respect to the pressure variation in the combustion chamber.

Furthermore, tightening the bolt (8) brings the effect of pressing the abutting surface (53) of the insulator (5) to the receiving surface (13) of the casing (1). Hence, it becomes possible to provide a hermetical contact between the receiving surface (13) of the casing (1) and the abutting surface (53) of the insulator (5) for preventing the combustion gas from leaking out via the clearance between the casing (1) and the insulator (5).

Namely, according to the present invention, it is preferable that a holding member (8) for holding the pressure sensing element (4) is disposed next to the one end of the coil side cylindrical portion (52) via the pressure sensing element, an outer cylindrical surface of the insulator (5) is brought into contact with a receiving surface (13) formed on an inner cylindrical surface of the casing (1) so that the insulator (5) is placed in a predetermined position with respect to the casing (1), and the pressure sensing element (4) and the insulator (5) are pressed to the receiving surface (13) of the casing (1) by the holding member (8) assembled with the casing (1).

According to this arrangement, a preload is always applied on the pressure sensing element (4). This makes it possible to assure output accuracy with respect to the pressure variation in the combustion chamber. Furthermore, pressing the insulator (5) to the receiving surface (13) of the casing (1) makes it possible to provide a hermetical contact between the receiving surface (13) of the casing (1) and the abutting surface (53) of the insulator (5) for preventing the combustion gas from leaking out via the clearance between the casing (1) and the insulator (5).

The primary winding (31) is disposed on the outer surface of the coil side cylindrical portion (52). All of the high-voltage components including the secondary winding (32) are accommodated in the inside space of the coil side cylindrical portion (52). Thus, the coil side cylindrical portion (52) of the insulator (5) surely insulates the high-voltage portion from the low-voltage portion. The component to be insulated and fixed by an insulating resin is limited only to the secondary winding (32). Hence, the ignition device of this invention does not encounter with the conventional resin crack leak caused by heat and cool cycles. Addition of a stress relaxing member and increasing the thickness of an insulating resin layer are unnecessary. A compact and simple arrangement for the ignition device can be realized.

One of two windings (31, 32) is directly wound around the coil side cylindrical portion (52) of the insulator (5). For example, the primary winding (31) is directly wound around the outer surface of the coil side cylindrical portion (52). In other words, the insulator (5) serves as a primary spool. Accordingly, the conventionally used resin-made primary spool can be omitted. Furthermore, as the insulator (5) has excellent heat resistance compared with the conventional resin-made primary spool, no heat releasing member is necessary for the resin members. The required costs will be decreased.

The portion insulated and fixed by a resin is limited to the secondary winding (32). The internal members accommodated in the casing (1) are fixed by the bolt (8). The ignition device is easily disassemblable. Hence, the casing (1) and the internal members are separable into individual members and, as a result, are reusable as recycling materials.

As the internal members accommodated in the casing (1) are fixed by the bolt (8), the fixing using resin charging or the adhesive material is no longer required. Thus, the ignition device can be easily disassembled. The metallic components, such as the casing (1), the bolt (8), the primary winding (31), the center core (33), and the connector output terminal (61), are separable into individual members and accordingly reusable as recycling materials.

Various Modifications

According to the above-described embodiment, the secondary winding (32) is located inside and the primary winding (31) is located outside with respect to the cylindrical insulator (5). However, the present invention is not limited to the disclosed layout. For example, it is possible to reverse the positional relationship so that the secondary winding (32) is located outside and the primary winding (31) is located inside with respect to the cylindrical insulator 5.

Furthermore, according to the above-described embodiment, tightening of the bolt (8) is employed to give a preload on the pressure sensing element (4). It is however possible to replace the bolt (8) with a holding member having no screw which can be press-fitted into the casing (1). Alternatively, after a holding member is inserted in the casing (1), it is possible to fix the holding member by caulking so that a predetermined preload is applied on the pressure sensing element (4). Moreover, it is possible to weld the holding member to the casing (1) under the condition that the holding member is inserted in the casing (1) with a preload applied on the pressure sensing element (4).

Furthermore, according to the above-described embodiment, a resin is injected after the secondary spool (34) and other internal components are inserted into the center bore of the coil side cylindrical portion (52). However, it is possible to harden the secondary winding (32) with an electrically insulating resin under the condition that the secondary winding (32) is wound around the secondary spool (34) and then insert the hardened assembly of the secondary winding (32) and the secondary spool (34) into the center bore of the coil side cylindrical portion (52).

According to this arrangement, compared with the case that a resin is injected, the productivity in the process of impregnating and hardening the secondary winding (32) can be improved. The required costs can be reduced. Furthermore, when the ignition device is disassembled, the secondary spool (34) assembled together with the secondary winding (32) and the center core (33) can be easily taken out from the coil side cylindrical portion (52).

The reference numerals in parentheses attached to above-described means or components show the correspondence to practical parts or components disclosed in the above-described embodiments.

While the invention has been shown and described in detail, the foregoing description is in all aspects illustrative and not restrictive. It is therefore understood that numerous other modifications and variations can be devised without departing from the scope of the invention.

What is claimed is:

1. An ignition device for an internal combustion engine, comprising a spark plug having a center electrode accommodated in a cylindrical insulator for generating a spark discharge in a combustion chamber of an internal combustion engine, an ignition coil having a primary winding and a secondary winding for supplying high voltage to said spark plug, and a pressure sensing element for detecting a pressure of said combustion chamber, wherein said spark plug, said ignition coil, and said pressure sensing element are accommodated in a cylindrical casing and installed in a cylinder head of said internal combustion engine, said insulator comprises a plug side cylindrical portion having an inner space for accommodating said center electrode and a coil side cylindrical portion extending from said plug side cylindrical portion in a direction departing from said combustion chamber, said coil side cylindrical portion has one end protruding in said direction departing from said combustion chamber with respect to said primary winding and said secondary winding, and said pressure sensing element is disposed next to said one end of said coil side cylindrical portion.

2. The ignition device for an internal combustion engine in accordance with claim 1, wherein a holding member for holding said pressure sensing element is disposed next to said one end of said coil side cylindrical portion via said pressure sensing element, an outer cylindrical surface of said insulator is brought into contact with a receiving surface formed on an inner cylindrical surface of said casing so that said insulator is placed in a predetermined position with respect to said casing, and said pressure sensing element and said insulator are pressed to said receiving surface of said casing by said holding member assembled with said casing.

* * * * *